United States Patent [19]

Menzel

[11] Patent Number: 4,995,929
[45] Date of Patent: Feb. 26, 1991

[54] METHOD OF PROTECTING CONDUITS INCLUDING HELICALLY WINDING A STRIP

[75] Inventor: Stanley W. O. Menzel, Burnside, Australia

[73] Assignee: Rib Loc Australia Pty. Ltd., Australia

[21] Appl. No.: 156,927

[22] PCT Filed: Mar. 12, 1987

[86] PCT No.: PCT/AU87/00069
§ 371 Date: Nov. 12, 1987
§ 102(e) Date: Nov. 12, 1987

[87] PCT Pub. No.: WO87/05676
PCT Pub. Date: Sep. 24, 1987

[30] Foreign Application Priority Data

Mar. 19, 1986 [AU] Australia .............. PH05111
Jun. 5, 1986 [AU] Australia .............. PH06269
Jun. 10, 1986 [AU] Australia .............. PH06322

[51] Int. Cl.⁵ .................. B29C 53/78; B29C 63/32
[52] U.S. Cl. .................. 156/187; 138/129; 138/154; 156/195; 156/294; 156/391; 156/392
[58] Field of Search .............. 156/156, 165, 195, 294, 156/391, 392, 184, 185, 187, 191, 194; 138/154, 122, 129, 135, 144, 150; 405/154, 155

[56] References Cited

U.S. PATENT DOCUMENTS

| | | | |
|---|---|---|---|
| 642,515 | 1/1900 | Boutillier | 138/144 |
| 2,695,255 | 11/1954 | Avery | 156/294 |
| 2,924,546 | 2/1960 | Shaw | 156/187 |
| 3,422,631 | 1/1969 | Silverman | 405/155 |
| 4,071,834 | 1/1978 | Comte | 156/175 |
| 4,376,005 | 3/1983 | Vitellaro | 156/195 |
| 4,549,752 | 10/1985 | Nimke et al. | 285/55 |
| 4,566,496 | 1/1986 | Menzel | 138/154 |
| 4,616,495 | 10/1986 | Menzel | 72/49 |
| 4,678,370 | 7/1987 | Allen | 138/154 |

FOREIGN PATENT DOCUMENTS

| | | | |
|---|---|---|---|
| 0040534 | 10/1986 | Australia . | |
| 1048690 | 3/1986 | Japan | 156/184 |
| 2103127 | 5/1987 | Japan | 156/293 |
| 2116130 | 5/1987 | Japan | 156/191 |
| 0000870 | 2/1985 | PCT Int'l Appl. . | |

Primary Examiner—Michael W. Ball
Assistant Examiner—Steven D. Maki
Attorney, Agent, or Firm—Gordon L. Peterson

[57] ABSTRACT

A method for protecting conduits in which a tube produced by helically winding a strip and interconnecting the edges of the strip to allow longitudinal slip is placed adjacent the area to be lined or overlapped. The tube is held at a selected diameter during placement and a winding force is applied by expander means driven along the tube to cause the interconnected edges to slip progressively change the diameter of the tube to engage the conduit. The progressive change may be caused by continuing the step of winding.

11 Claims, 6 Drawing Sheets

METHOD OF PROTECTING CONDUITS INCLUDING HELICALLY WINDING A STRIP

This invention relates to an improved method of and means for lining or over-wrapping of conduits and the lining of tunnels.

In the past when a conduit such as a sewer pipe made of clay or concrete or cast-iron has become in need of repair, a tube of plastics of a diameter smaller than, or greater than, the corroded or damaged part was placed into position to cover at least the damages areas.

In the case where the conduit required to be lined the annular space between the new tube and the old clay or concrete or cast-iron pipe was filled with grout, usually a cementitious nature, but one of the problems of such a practise was that, in the case of the finished relined conduit, the conduit so formed is of smaller diameter than the original conduit, particularly when allowance for grouting is required.

More importantly a conduit to be relined is usually out of alignment and has undulations and curves, which means that the relining tube which is formed of a plastics material must be even smaller in diameter to negotiate such undulations and misalignment.

Also when a hole is formed directly into the soil for the purpose of carrying water or cables, or vertically for the purpose of creating a well or bore hole, the lining of such holes requires a lining pipe of a diameter considerably smaller than the bore of the hole because of the friction which is generated between the earth and the liner pipe being inserted.

One of the objects of the present invention is to provide an improved method of and means for lining conduits either where an existing conduit is to be replaced or where a new conduit is to be provided.

A further object is to provide an effective method and means for applying an encasing tube to an existing pipe.

A still further object is to provide a machine of relatively simple construction and to provide a method of insertion and a form of tube which forms the lining whereby the lining can readily be positioned with a minimum loss of cross sectional area of the conduit.

The objects of the invention are achieved by utilising a tube formed by winding a strip helically and interconnecting the edges of the convolutions of the strip with a controllable slidable fit to produce a tubular article, with or without longitudinally running or otherwise positioned ribs, characterised by the steps of holding the tube at a selected diameter while positioning it in or on a conduit, then changing the diameter of the tube by causing the interconnected edges of the strip forming the tube to slide one relative to the other, and maintaining the tube at the changed diameter.

The invention can be brought into effect by producing a tube by helically winding on a machine of a type forming the subject of earlier patents by the same Inventor, using either an annulus of rollers or using differential driven rollers which curve the strip to the required form and overlap the edges, which strip is formed from a thermoplastic material which may have a smooth surface on one side and a ribbed surface on the other side but can be a plain strip with edged interengaging formation, and may have a surface adapted to lock to grouting.

Under some conditions the surface can be smooth on both sides and the strip can be formed to have longitudinal closed cavities formed between the ribs but the strip is such that the machine can curve the strip in an annulus or by rollers to form a tube by helically winding the strip and interengaging the overlapping edges of the strip.

Thus according to this known art a strip of a required profile is formed of plastics which may be made by the extrusion process to have the interlocking members at two edges of the strip so that when such a strip is wound in the helical winding machine to interlock the edges of the strip, it is formed into a tube of relatively great strength and durability.

Normally these tubes are formed in a way such as to retain the diameter after winding, the interconnecting means at the edges of the strip being arranged to so tightly interfit and lock together, particularly when adhesive is introduced into locking members, that the tube, inspite of its tendency to unwind due to the strip having been curved during manufacture, will then retain the necessary diameter.

According to this invention therefore the strip is so formed that the interconnecting edges can slide one in relation to the other so that by applying a winding or unwinding force on the tube so formed, its diameter can be increased or decreased at will.

It will be known that one of the great problems in forming pipes from plastic strip, which not only resists bending but tends to change its dimension by unwinding after the pipe is formed, requires great skill in design of machines which wind pipes and in the selection of a cross section of such strips and the method of interengaging the overlapping edges to maintain a stable structure.

By forming the strip so that controlled slip can occur, character changes may occur and this can be aided by coating overlapping edges with a water-proofing grease or silicone sealant, with means being provided to control the strip diameter and means to hold the strip in its new diameter such as by expanding it against a pipe or using its unwinding force to allow it to expand into a pipe or conduit when sufficient force is applied to break frictional grip between the interengaging edges or to sever fracturable members formed on the strip or applied in the nature of holding strips which maintain the correct diameter of the tube until the necessary force is applied to cause the slip to occur between the overlapping edges to allow the tube to reach its new diameter.

In order however that the nature of the invention will be fully appreciated embodiments thereof will be described with reference to the accompanying drawings in which.

Figures 1, 2, 3:
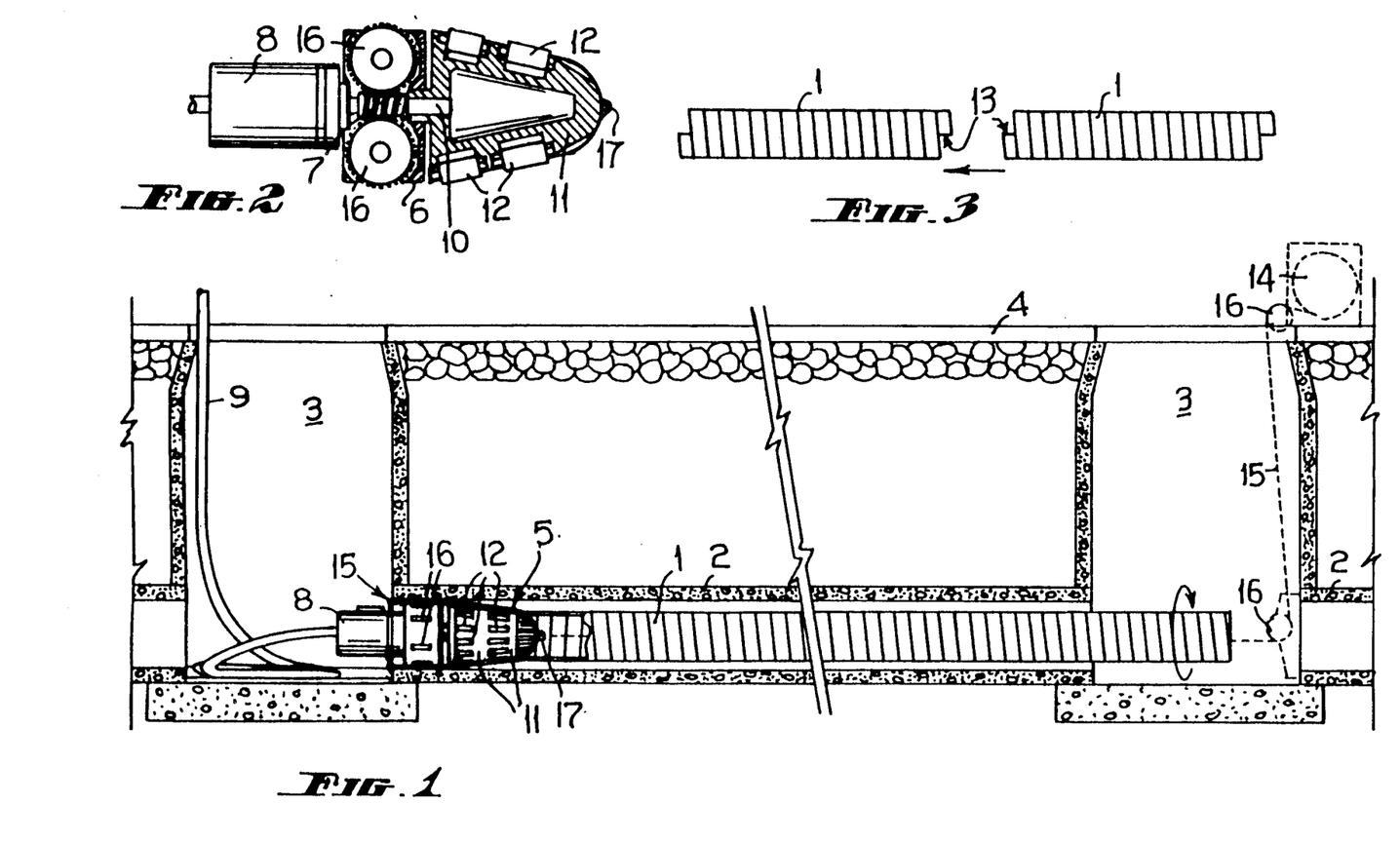
FIG. 1 is a somewhat schematic sectional view showing a sewer line or similar conduit having access holes at intervals, and showing a helically wound tube in position for relining the conduit and indicating how a tube expander can be inserted at one end of the tube at an access hole and can be driven through to the other end to expand the helically wound tube to form a liner to the conduit.
FIG. 2 is a somewhat enlarged longitudinal section of the tube expander which both expands the helically wound tube and moves the device forward along the conduit being lined.
FIG. 3 shows how the conduit may be made in sections to allow it to be placed into position through the access holes and showing how the ends can be joined by welding or otherwise securing together the strips where they abut and interconnect by virtue of the interengaging edges.

Referring first to FIGS. 1, 2 and 3, a system is shown in which a helically wound tube 1 is positioned within a conduit 2, such as a sewer which is to be relined, the two ends of the portion to be relined terminating in access holes 3 formed in a roadway 4 or the like and this helically wound tube is adapted to be expanded by a tube expander 5 which can conveniently comprise a body 6 carrying axially within it a worm wheel 7 driven from a hydraulic motor 8 having a supply line 9 leading to a suitable hydraulic power source.

The shaft 10 on which the worm wheel 7 is mounted carries a rotating head 11 which may have a longitudinally fluted outer surface as shown at the leading end but preferably as shown has a series of rollers 12 projecting from its face circumferentially around the rotating head 11 so that when the rotating head 11 is driven in a direction to unwind the strip of the helically wound tube 1 the overlapping edges of the strip move one on the other when a sufficient force is applied. By appropriately spacing the rollers 12 the friction of the rotating head 11 on the helically wound tube 1 can be selected.

The action of this device is that as the tube expander is driven forward by the forward driving discs 16 engaging the expanded portion of the helically wound tube 1, the tube expander rotating head 11 is moved forward in the helically wound tube 1, and as it is of wedge shape this, coupled with the rotating action in a unwinding direction, progressively expands the helically wound tube 1 to lie against the inner wall of the conduit 2.

It is necessary for the helically wound tube 1 to have a length in excess of the length of the conduit 2 to be lined and where access necessitates this the helically wound tube 1 can be formed in sections as shown particularly in FIG. 3 and as the expanding of the tube 1 proceeds, the length of the helically wound tube 1 will of necessity decrease but further sections of the helically wound tube 1 can be added to it by abutting the adjacent edges of two axially aligned helically wound tubes and welding or otherwise fixing together the edges 13 so that with the interengagement of the interlocking means on the overlapping parts of the tubes a continuous length of tube is formed which can be progressively expanded.

If required the tube expander 5 can be aided in its forward motion by a winch 14 and cable 15 passing around pulleys 16A and attached to an anchor 17 on the rotating head 11, a swivel being used in the cable to allow free rotation of the rotating head 11.

It will be seen that in the form shown in FIGS. 1, 2 and 3 a previously formed helically wound tube 1 is used in the conduit 2, which as said may be built up in sections to have the required length to allow for the contraction which occurs when the helically wound tube 1 is expanded, the expansion in this case being mechanically effected by the incrementally forwardly moving tube expander 5 and the rotation of the head to wind the strip which forces the helically wound tube 1 outwardly until the required expansion has been achieved.

Figures 4, 5, 6:
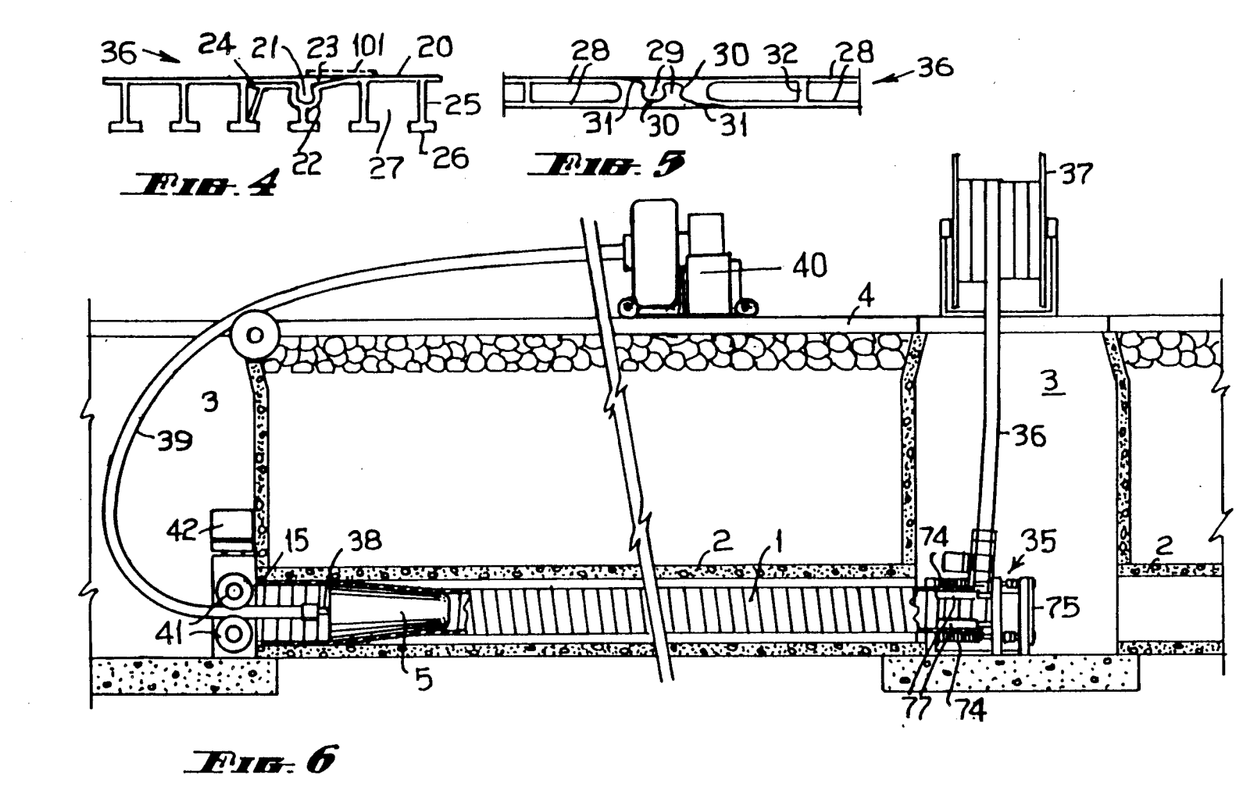
FIG. 4 is an end elevation of a typical strip forming a tube, showing how the edges overlap, such strips being well known in the art and described in the specification of Australia Patent No. 527,417.
FIG. 5 shows a modified form of strip.
FIG. 6 shows a view somewhat similar to FIG. 1 but showing the invention applied to a preferred method according to which the helically wound tube is expanded into a sewer or other conduit which is to be relined, showing a winding machine with an annulus which progressively forms the tube insitu and showing the method used for progressively expanding the tube during the appropriate part of the tube winding process.

In FIGS. 4 and 5 are shown respectively two forms of strips, the strip of FIG. 4 being the usual ribbed strip 20 having a bulbous joining bead 21 engaged by a longitudinal socket 22 and including a feathered edge 23 projecting from the bulbous joining bead, a feathered edge 24 being formed at the edge of the socket 22 so that when under pressure these feathered edges seal the strip against flow of fluid through the join.

The ribs 25 have expanded ends 26 which ends can take any required form and the cavities 27 formed between the ribs can, when the helically wound tube 1 is being positioned as shown in FIG. 1, serve to hold grouting or any other sealing medium which can effectively seal the expanded helically wound tube 1 against the inner wall of the conduit 2.

Different forms of strip can of course be used as indicated by one form in FIG. 5 in which a double wall 28 has at one edge a bulbous joining bead 29 with a socket 30 formed on the opposite edge of the adjacent part of the strip, feathered edges 31 being again shown as well as stiffening ribs 32.

Referring now to the modified system shown in FIG. 6 in which similar components have the same reference numerals, as in the foregoing described form, the helically wound tube 1 is wound into the conduit 2 by a winding machine 35 which may be of the type later described herein and draws a strip 36 from a reel 37 and helically winds it into the tube 1.

According to this method winding continues until the forward moving end of the helically wound tube 1 reaches the end of the conduit 2 opposite to the position of the winding machine 35 whereupon winding is stopped and the end of the helically wound tube is expanded by applying a rotational force to this end of the helically wound tube while holding the other end against rotation. The end 15A of the tube is again fixed to the conduit 2 and a tube expander 5 is inserted into the helically wound tube 1, which tube expander 5 is again of tapered form and may be a solid member provided with rollers as in the case of FIG. 1 or may be an inflatable member, but this tube expander 5 is rotated by means of a sheathed cable 38, the sheath 39 extending to a hydraulic motor 40 and arranged so that while the sheath remains non-rotational the sheath cable 38 is driven to apply an unwinding force to the strip through the rotating tube expander 5.

To move the tube expander 5 forwardly the sheath 39 is engaged between a pair of drive rollers 41 rotated by means of a hydraulic motor 42 to urge the sheath 39 with the sheath cable 38 forwardly to drive the tube expander 5 to the other end of the conduit.

The unwinding of the helically wound tube 1 by the action of the rotating tube expander 5 requires that the helically wound tube 1 is both expanded and its length increased and this is achieved by simultaneously driving the winding machine 35 to keep forming the strip 36 into a tube and in this way it is possible to expand the helically wound tube 1 firmly into the conduit 2 and to add the extra length required in the expanded tube as expansion takes place.

It will be realised that the form shown in FIG. 6 again effects mechanical expansion of a helically wound tube 1 into contact with the wall of a conduit 2 by appropriately winding the strip insitu into a helically wound tube, extending the length of the tube as wound by an amount required to compensate for the additional length of strip needed in the expanded form of the helically wound tube.

In the form of the invention illustrated in FIGS. 7 to 15 a modified method of expanding the tube is shown using pneumatic means to assist in the expanding of the helically wound tube 1 into the conduit 2.

Figures 7, 8:
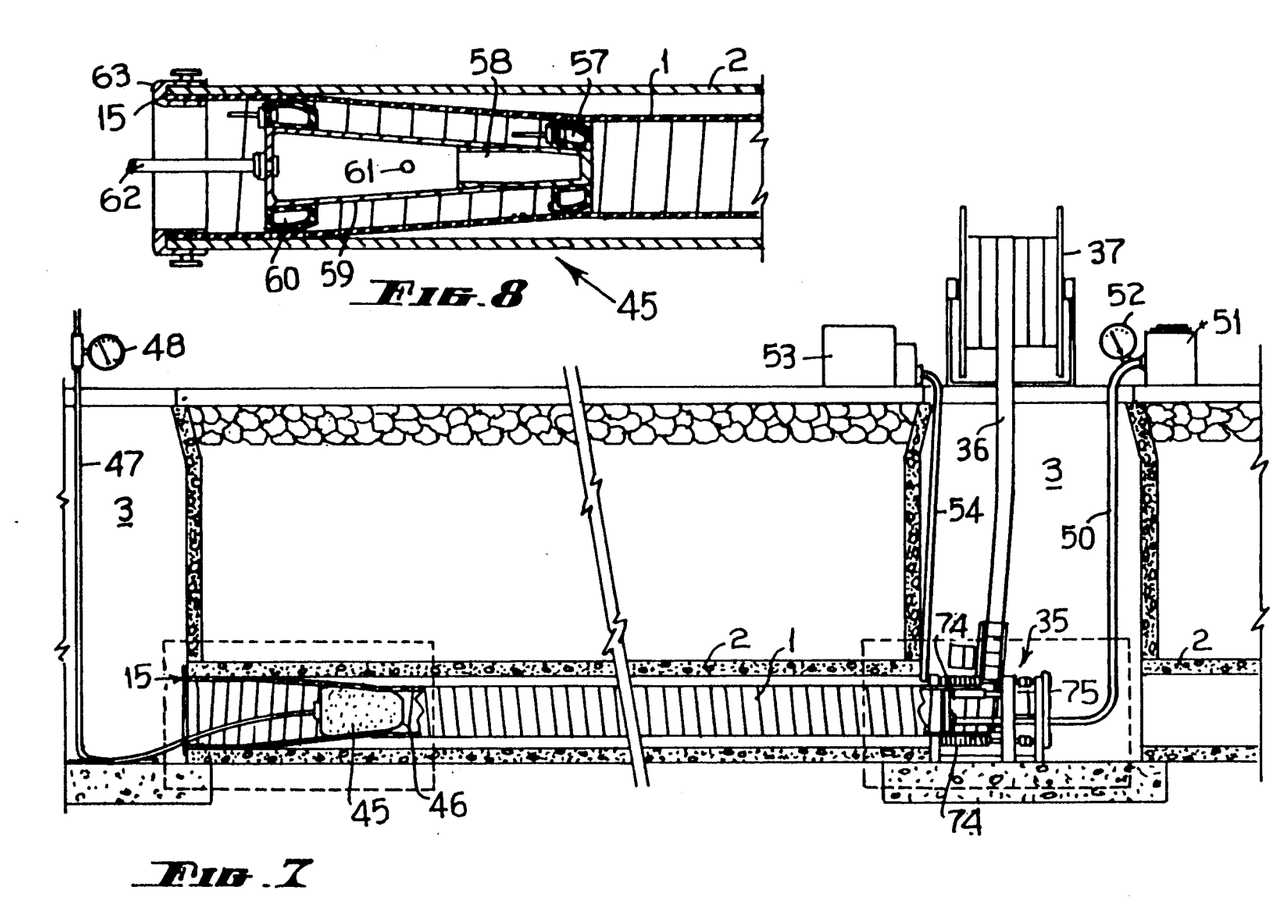
FIG. 7 is an enlarged longitudinal section of a modified form of device for expanding the helically wound tube, using a vacuum method for maintaining the tube diameter during winding while progressively expanding the tube from the end remote from the winding machine.
FIG. 8 shows to a larger scale, means of a form different to that shown in FIG. 7 for controlling expansion of the tube.

Referring first to FIG. 7, the helically wound tube 1 is located in the conduit 2 in an unexpanded condition as in the previous cases, but is then expanded after the end 15 of the helically wound tube 1 has been expanded to engage the inner wall of the conduit 2, has its progressive expansion applied by means of a tapered bung 45 which may be formed of an inflatable member, but has its leading edge 46 of a dimension to fit neatly into the helically wound tube 1 to form a pneumatic seal.

A tube 47 from this bung is shown extending to a pressure gauge 48, the line 47 being connected to a pressure source, not shown.

The winding machine 35 which forms the strip 36 from the reel 37 again winds the strip to overlap the two edges and interlock the two overlapping edges with sufficient force to maintain the helically wound tube at the dimension in which it is formed and when the bung 45 has been inserted to seal the end of the helically wound tube 1 remote from the winding machine 35, vacuum held in the tube prevents the helically wound tube from expanding under stress of the unwinding rotational force applied to it.

Suction is applied through a diaphragm seal 49 by means of the pipe line 50 leading to a vacuum unit 51, a pressure gauge 52 being shown to allow correct pressure between the tapered bung 46 and the diaphragm 49 to be maintained.

The vacuum in this part of the tube holds the tube to its required diameter as winding continues because as in the previous case winding must continue to compensate the amount of strip 36 used to form the larger diameter as the helically wound tube 1 is expanded.

Because of the vacuum existing between the bung 45 and the diaphragm seal 49, the bung 45 moves forward as the tube expands so that no other forward drive is required.

Expansion of the helically wound tube 1 however does not take place under influence of the outward pressure of the bung 45 because of its taper but as the vacuum is held between the bung 45 and the diaphragm seal 49, that portion of the helically wound tube 1 beyond the leading part of the bung 45 is not under vacuum and as formation of the helically wound tube 1 continues with the strip 36 being wound into the tube forming portion of the machine 35 the rotational force on that portion of the helically wound tube 1 beyond the bung unwinds the strip by causing slip between the overlapping edges to wind the strip into its larger diameter against the conduit 2.

A grouting machine 53 is indicated which has a discharge line 54 to supply grouting material to the outside of the helically wound tube 1 as it is formed the grouting being carried forward by the rotating tube but measured in quantity to ensure that there is only sufficient grouting available to seal the helically wound tube 1 to the inside of the conduit 2.

Cementing means could of course be used instead of grouting.

It will also be realised that in the form of the machine shown in FIG. 7 the expansion of the tube is by winding the tube from the end 15A progressively forward to the end where the winding machine 35 is situated, the bung 45 being self regulating in position and moving forward only as the tube expands to maintain correct holding of the tube to the locality where expansion is taking place progressively in a forward direction.

In the form shown in FIG. 8 a further modification of the method described with reference to FIG. 7 is included and in this case differential pressure is used to aid expansion of the helically wound tube.

In this form which shows the helically wound tube 1 being expanded into a metal conduit such as a sewer or water line, the device in this case comprising a second diaphragm seal 57 mounted on a stem 58 which in turn is rotationally mounted on an extension 59 of the stem which terminates in an inflatable diaphragm 60 the extension 59 being apertured at 61 to provide communication from a pressure line 62 to the space within the helically wound tube 1 between the second diaphragm seal 57 and the inflatable diaphragm 60.

The member 58-61 forms a bung corresponding to the bung 45.

Both the second diaphragm 57 and the inflatable diaphragm 60 may be pre-inflated to select their effective diameter but both of these members 57 and 60 could be of a selected size without inflation or both could have lines to pressure means so that both could be inflated during operation to a required pressure.

The basis of the device of FIG. 8 is to hold the vacuum in the helically wound tube 1 between the second diaphragm seal 57 and the first diaphragm seal 49 at the winding machine end of the helically wound tube 1, but to apply an expanding pressure between the second diaphragm seal 57 and the inflatable diaphragm seal 60 so that this part of the helically wound tube 1 is assisted in its expansion by the application of pressure to the inner face of the helically wound tube 1.

Clamping means 63 hold the end 15A of the helically wound tube 1 firmly to the conduit 2.

A line 62 for applying pressure between the second diaphragm seal 57 and the further diaphragm 60 is shown.

It will be realised that in this form of device highly effective control of the various sections of the conduit 2 can be maintained during the forming of the helically wound tube 1 and the expansion of the helically wound tube and the stem 58 and extension 59 together with the second diaphragm seal 57 and the inflatable diaphragm 60 move forward automatically due to the vacuum applied between the second diaphragm seal 57 and the first diaphragm seal 49, the inflatable diaphragm 60 controlling the forward movement as because of its dimension it will only allow the assembly to move forward as the helically wound tube 1 is expanded to its full diameter against the inner wall of the conduit 2.

To aid the action the pressure in the pressure line 62 may pulsate to apply a hammering action to the part of the tube being expanded.

Figure 9:
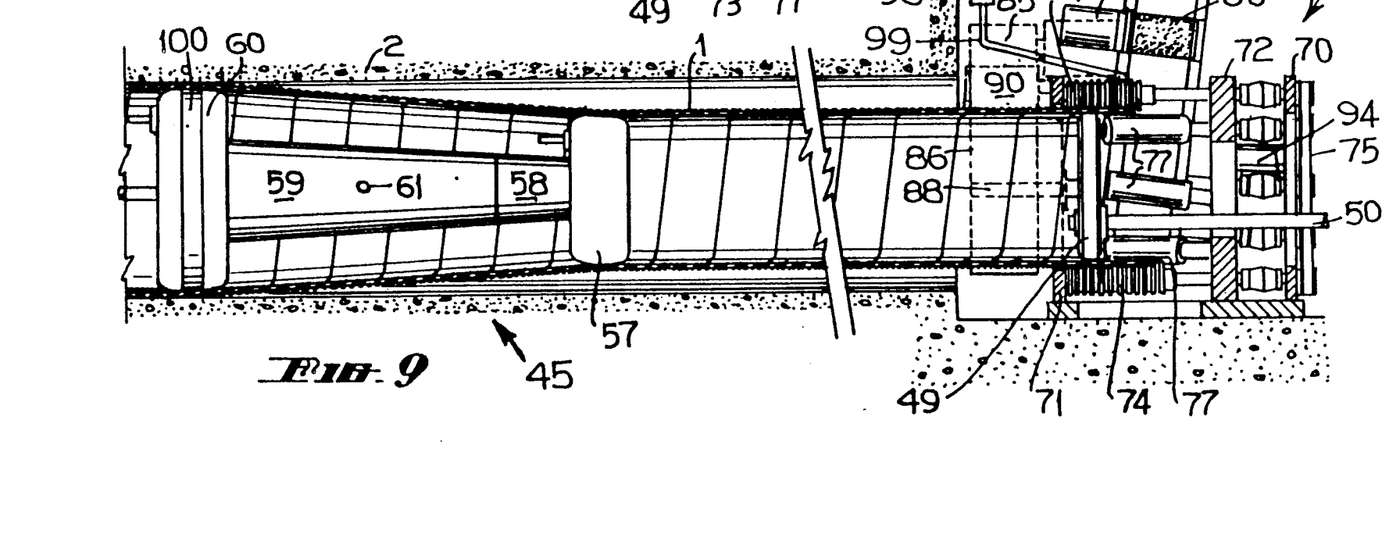
FIG. 9 is a view demonstrating the vacuum principle of relining a conduit such as a sewer line by forming the strip into a tube by the machine which winds the strip to cause the tube to be extended along the conduit, and showing the expansion control mechanism of a type illustrated in FIG. 8 showing also means to control locking of the overlapping edges of the strip.

Referring now to the form shown in FIGS. 9 to 16 in which further details of a preferred form are shown, the helically wound tube 1 is being wound into a conduit 2 using a winding machine 35 and the tube expansion means as shown more particularly in FIG. 9, the winding machine comprising frame members 70 71 and 72, the members 71 and 72 supporting driving rollers 73 having annular ribs around their peripheries to match the corrugations of the strip being formed into the tube and these rollers as well as further intermediate rollers 74, of a similar configuration all forming between them an annulus, are driven by belt means 75 through universal joints and the driven by rollers 74 co-act with pressure rollers 77 to guide the strip 36 around the helical path and serving as adjoining means for pressing together the overlapping edge portions of the strip.

The strip enters the winding machine 35 between a pair of rollers 78 and 79, the rollers 79 again having circumferential ribs to correctly guide the strip.

Figure 16:
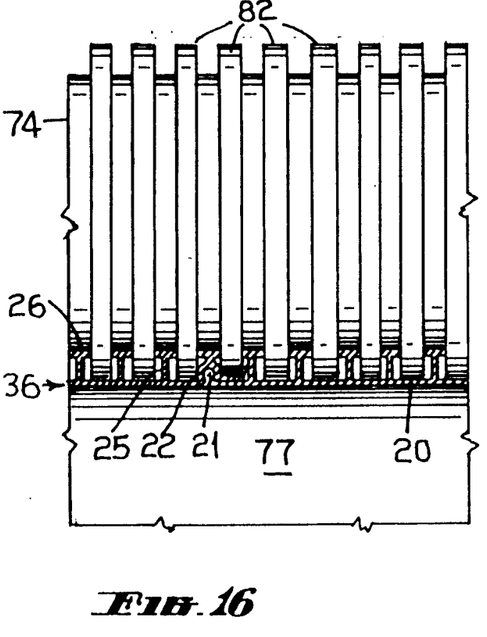
FIG. 16 is an enlarged view showing part of one of the driving rollers and part of a pressure roller, showing how the driving roller is grooved to allow the pressure to be applied from the expanded part of the driving roller to the base of the strip to force the base of the strip against the pressure roller.

The strip is driven into the winding machine 35 by a pair of rollers, the first roller 80 being a driving roller powered by a hydraulic motor 81 the second roller 82 being a ribbed roller with the ribs again running circumferentially to engage the strip 36, the purpose of this construction being to allow the strip to be very firmly driven by having the circumferential ribs designated 82 in FIG. 16 engage the base 83 of the strip 36 so that the maximum driving force is exerted between the two rollers onto the strip.

The configuration of the rollers 73 and the rollers 77 is similarly arranged to achieve maximum drive and control of the tube being formed.

The pressure rollers 77 are supported on shafts 84 which project from the frame member 72 and terminate adjacent to the diaphragm seal 49 and the diaphragm seal 49 can be supported from the shafts of these rollers so that the diaphragm can be in a position within the area of the driving rollers 73 so that the strip when formed into the helically wound tube 1 is fully supported with an inward loading by the vacuum between the diaphragm seal 49 and the second diaphragm seal 57.

Figure 10:
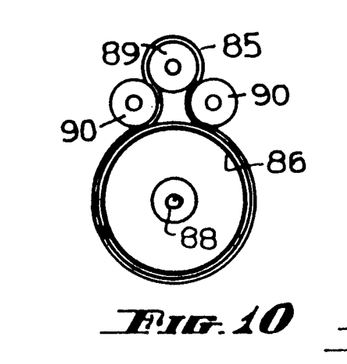
FIG. 10 is a view showing how an extra drive can be applied by a belt to the tube as it leaves the winding machine, this being indicated in dotted lines in FIG. 9.
Figure 11:
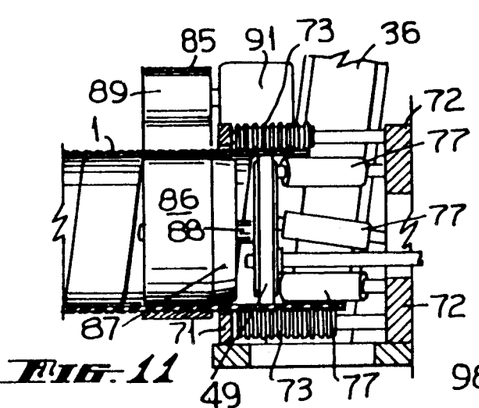
FIG. 11 is a fragmentary view of the winding machine similar to that shown in FIG. 9 but including the added belt drive.

If it is found necessary, the helically wound tube 1 can be further driven by a belt 85 passing around the helically wound tube 1 adjacent the exit point from the driving rollers 73 and this part of the helically wound tube 1 can be supported by a drum 86 with a tapered lead in 87 and mounted on a shaft 88 supported from the diaphragm seal 49.

The belt is passed round the major periphery of the helically wound tube 1 as shown in FIG. 10 and is driven from a pulley 89 and two idler pulleys 90 which are adapted to be adjusted to maintain belt tension. The pulley 89 is driven from a hydraulic motor 91.

Figures 12, 14:
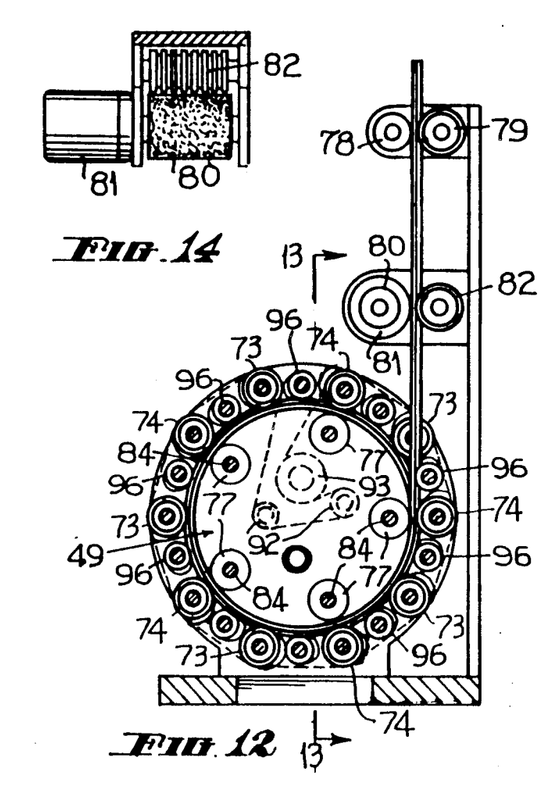
FIG. 12 is a transverse section to an enlarged scale of the tube winding machine as taken on line 12—12 of FIG. 13.
FIG. 14 is a horizontal section of the driving mechanism for the tube take on line 14—14 of FIG. 13.
Figure 13:
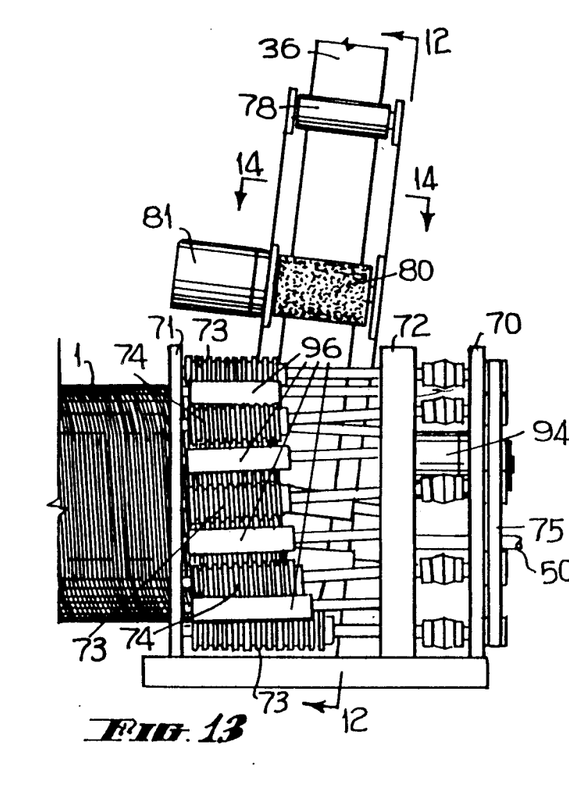
FIG. 13 is a side elevation of the winding machine showing the tube wound according to this invention being projected therefrom.
Figure 15:
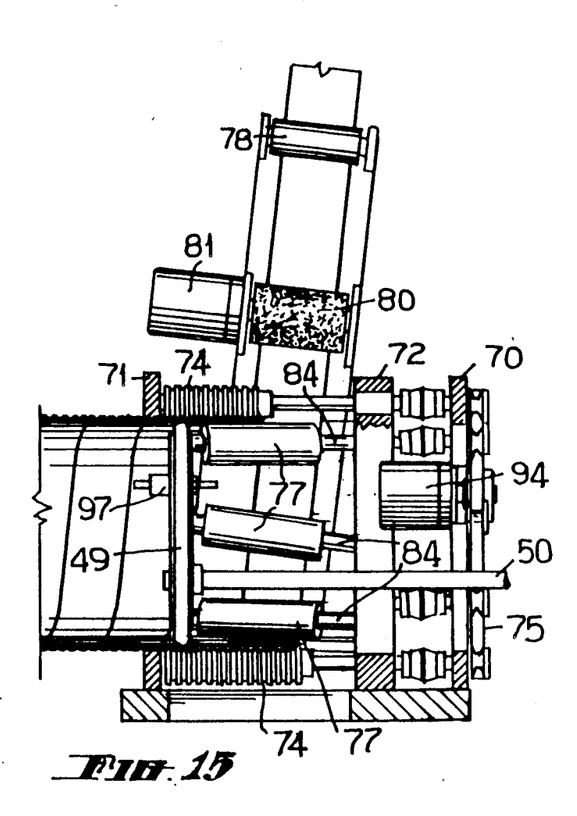
FIG. 15 is a view similar to FIG. 13 sectioned on line 13—13 of FIG. 12 to show the seal at that end of the tube and to show more particularly the interaction of the driving rollers and the pressure rollers.

The dotted configuration in FIG. 12 shows how the belt 75 which drives the driving rollers 73 can be taken around pulleys 92 and a drive pulley 93 which is driven by a hydraulic motor 94.

The diaphragm seal 49 is apertured to allow a vacuum line 95 to pass through it, and the diaphragm seal 49 also has a bleed control valve 97 opening through it.

An extra series of rollers 96 are positioned between the driving rollers 73 to increases support for the strip 36 as it is driven around the helical path.

Because the joint between the over-lapping parts of a strip must have controllable sip, it is necessary to provide means to control and lock or hold the join this invention incorporates means at selected locations means such as a wire or powder or a specific material which may be a plastic which can be treated after formation of the structure to cause the material to flow and form a permanent junction at points of overlap or where joins or seals are to be made, and this material can form a lubricant during winding and during subsequent resizing and can then set or be changed to prevent further slip.

This is typically shown in FIG. 9 of the drawings where a lubricant, held in a supply tank 97 has a feed by flow control means 98 through a pipe 99 to the area of the strip 36 where the edges overlap just prior to the join being effected.

The inflatable part 60 of the tube expander 5 carries an annular portion 100 which has means in it such as a heating wire or high frequency means whereby the character of the lubricant is changed to form holding means.

The lubricant used can be a polyurethane slow setting adhesive which when first applied is in a fluid state and allows and enhances slip but after a time sets to seal against further slip.

A two component compound can also be used which can be mixed and applied to the overlapping parts of the strip and allowed to set by chemical reaction after the tube has been expanded.

Similarly a hot melt can be used which thickens as it cools, or a thermosetting compound can be applied which can be heat set after expansion of the tube by a device such as is indicated by 100 in FIG. 9, or a hot melt or other bonding medium can be used in a system such as is described in FIG. 7 in which the bonding medium is softened as it is applied but consolidates as a sealant immediately the tube 1 is wound to lock the tube against expansion as it is wound into the conduit 2, but the bung 45 or the part 57 in FIG. 8 is heated to melt the bonding medium to allow the continued winding to expand the tube 1 against the conduit 2.

The strip could have a powder, such as a metal powder, applied to the join or wound into it adjacent to an area where the control is required and this powder can be heated by high frequency induction means to melt the plastic sufficiently to make a permanent joint through plastic flow interchange between the two contacting surfaces at the overlapping ends or a wire could be wound into the interengaging members of the strip and locally heated at selected localities by microwave means.

By using a high frequency heating system it is possible also to so select the plastic that the bonding can automatically be affected because the plastic itself, instead of containing a conductive powder can be chosen so that heating will take place at a relevant position such as during the extrusion varying the plastic content or adding another plastic substance to allow the heating to take place at the interface, and it will be realised that by use of the present invention, as the material which is heated can be placed at the exact site where the plastic is to be caused to flow to make the joint, the remainder of the strip will be unaffected, but any overlapping portions, will be joined at the relevant position so that at the interface the plastic will be caused to flow sufficiently to bond the two contiguous sections permanently together by plastic flow.

In the case of a plastic which is not thermoplastic, control is still possible using a hot mix or the like which bonds to the plastic.

The material instead of being a powder can be a paint or conductive medium in liquid flow which can be located at the interface if required and this material itself can be so chosen that when heated it will bond to the fluid plastic at the interface to give a homogenous sealing together of the plastic adjacent to the interface.

Also a strip 101 such as shown in FIG. 4 can cover the joint, to be fractured to allow slip when the tube is wound to change its diameter.

I claim:

1. A method of protecting conduits comprising helically winding a strip at a first location to slidably interconnect edges of the strip to form a tube with the tube and conduit being arranged one within the other, continuing said step of winding to advance one end of the tube along the conduit to a second location and causing the interconnected edges of the strip to slip one on the other to progressively change the diameter of the tube from said second location toward said first location to place the tube closer to the conduit, and said step of causing including continuing said step of winding.

2. A method as defined in claim 1 wherein the tube is within the conduit and said step of causing includes holding the tube at said second location against rotation and continuing said step of winding to progressively expand the diameter of the tube from said second location toward said first location.

3. A method of protecting conduits comprising helically winding a strip at a first location to slidably interconnect edges of the strip to form a tube with the tube and conduit being arranged one within the other, continuing said step of winding to advance one end of the tube along the conduit to a second location and causing the interconnected edges of the strip to slip one on the other to progressively change the diameter of the tube from said second location toward said first location to place the tube closer to the conduit, and said step of causing including holding the tube at said second location against rotation and continuing said step of winding.

4. A method of protecting conduits comprising helically winding a strip at a first location to slidably interconnect edges of the strip to form a tube with the tube and conduit being arranged one within the other, continuing said step of winding to advance one end of the tube along the conduit to a second location and causing the interconnected edges of the strip to slip one on the other to progressively change the diameter of the tube from said second location toward said first location to place the tube closer to the conduit, the tube being within the conduit and said step of causing including continuing said step of winding to expand the diameter of the tube.

5. The method of protecting conduits comprising the steps of positioning a winding machine at a selected part of the conduit to be protected, feeding a strip to the winding machine and helically winding the strip into a tube by connecting complementary connecting means formed on the edges of the strip which complementary connecting means allow longitudinal slip between the interconnected edges, the tube and conduit being positioned one within the other, causing the helically wound tube to progress along the conduit, causing the interconnected edges of convolutions of the strip to slip one on the other to change the diameter of the tube to cause a first end of the tube to engage the conduit, holding the first end of the tube remote from the winding machine in fixed relationship to the conduit, and continuing said step of helically winding to cause the tube to engage the wall of the conduit progressively from the first end of the tube to the other end of the tube.

6. The method of lining a conduit comprising the steps of positioning a winding machine at a selected part of the conduit, feeding to the winding machine a strip having complementary connections at opposite edges of the strip, winding the strip in the winding machine to slidably interconnect the edges of the convolutions of the strip to form a helically wound tube and cause the helically wound tube to progress from the winding machine along the conduit, at least retarding the rotation of the end of the tube remote from the winding machine when a required length of tube has been formed, and continuing said step of winding while progressively controlling slip between the interconnected edges of the convolutions of the strip from the end of the tube remote from the winding machine toward the winding machine whereby to progressively expand the tube from the remote end of the tube to the winding machine end of the tube.

7. The method of claim 6 comprising applying a slip control medium to the interconnected complementary connections of the strip as it is wound into a tube, and modifying the slip control medium after the diameter of the tube has been changed whereby to prevent further slip.

8. The method of claim 6 comprising applying a bonding medium between the tube and the conduit to bond the tube to the conduit when engaged against a wall on the conduit.

9. The method of claim 6 comprising winding a wire into the joint between the interconnected complementary connections of the convolutions of the strip of the tube and heating selected parts of the wire by microwave means.

10. The method of protecting conduits which comprises positioning a winding machine at the end of the conduit, feeding a strip to the winding machine having complementary connections at opposite edges of the strip, helically winding the strip in the winding machine to slidably interconnect the edges of the convolutions of the strip to form a helically wound tube and to cause the helically wound tube to progress along the conduit to the remote end of the conduit to be lined, expanding a first remote end of the helically wound tube by unwinding the tube by causing slip of the interconnected edges of convolutions of the strip, holding the expanded first remote end of the tube in fixed relationship to the conduit, inserting a bung into the first expanded end of the tube and moving the bung toward the winding machine while continuing winding the strip with the winding machine to progressively cause the tube to be expanded by an unwinding action caused by the movement of the bung toward the winding machine said bung being tapered with the smaller end leading and the part between the leading smaller end and the trailing larger end effecting the expansion progressively as the winding of the tube continues.

11. A method of protecting conduits which comprises positioning a winding machine at an end of the conduit, feeding a strip to the winding machine having complementary connections at opposite edges of the strip which are slidably interconnected by the winding machine to wind the strip into a helically wound tube and to cause the helically wound tube to progress along the conduit to a remote end of the conduit to be lined, expanding a first remote end of the helically wound tube by unwinding the tube by causing slip of the interconnected edges of convolutions of the strip, holding the expanded first remote end of the tube in fixed relationship to the conduit, inserting a bung into the first expanded end of the tube and moving the bung toward the winding machine to progressively cause the tube to be expanded by an unwinding action caused by the movement of the bung toward the winding machine, and maintaining a vacuum in the tube between the winding machine and the bung whereby to hold the tube against expansion between the winding machine and the said bung during initial winding of the tube.

* * * * *